United States Patent [19]

Nakai et al.

[11] Patent Number: 4,886,972
[45] Date of Patent: Dec. 12, 1989

[54] FAR INFRARED RAY EMITTING BODY OF A CORE MATERIAL COATED WITH AN ULTRAFINE POWDER

[75] Inventors: Hirotaka Nakai, Kyoto; Setsuji Edagawa, Nishinomiya, both of Japan

[73] Assignee: O.K. Trading Co., Ltd., Osaka, Japan

[21] Appl. No.: 296,026

[22] Filed: Jan. 12, 1989

[30] Foreign Application Priority Data

Aug. 3, 1988 [JP] Japan ................................. 63-192781

[51] Int. Cl.$^4$ .............................................. C09K 9/00
[52] U.S. Cl. ............................. 250/504 R; 250/493.1; 250/495.1
[58] Field of Search .............. 250/504 R, 493.1, 494.1, 250/495.1

[56] References Cited

U.S. PATENT DOCUMENTS

| 4,001,588 | 1/1977 | Elsner | 250/493.1 |
| 4,377,618 | 3/1983 | Ikeda et al. | 428/323 |
| 4,499,382 | 2/1985 | Vincent | 250/504 R |

FOREIGN PATENT DOCUMENTS 62-184088  8/1987  Japan .

OTHER PUBLICATIONS

Kim et al., "Theoretically Dense (99.9%) Polycrystalline Alumina Prepared from Cryochemically Processed Powders", Ceramic Bulletin, vol. 50, No. 6, (1971), pp. 532–34.

Primary Examiner—Carolyn E. Fields
Assistant Examiner—John A. Miller
Attorney, Agent, or Firm—Oblon, Spivak, McClelland, Maier & Neustadt

[57] ABSTRACT

A far infrared ray emitting body is disclosed. The body comprises a core material having an ultrafine powder of one or more compounds selected from alumina hydrate, silica hydrate, alumina, silica, and silicate adhered on said core material. This material as itself or combined with other substances can provide far infrared radiation to various objects to effect excitation vibration of water molecules in the objects.

3 Claims, No Drawings

FAR INFRARED RAY EMITTING BODY OF A CORE MATERIAL COATED WITH AN ULTRAFINE POWDER

BACKGROUND OF THE INVENTION

1. Field of the Invention

This invention relates to a far infrared ray emitting body, and, more particularly, to a far infrared ray emitting body which as itself or combined with other substances can provide far infrared radiation to various objects to effect excitation vibration of water molecules in the objects. The far infrared ray emitting body has a wide variety of uses in the fields of drying, heating, food processing, plant growth, health promotion, and the like.

2. Description of the Background

Among various far infrared ray emitting bodies, papers and woods cannot be used at a high temperature because of their ready combustibility. Metals exhibit only a small radiation activity. Ceramics which are inorganic oxides are considered as the most effective far infrared ray emitting bodies. A number of studies on ceramic far infrared ray emitting bodies have been reported, including zirconia, titania, alumina, as well as low-thermal expansion materials such as cordierite, β-spodumene, aluminum titanate, and the like. Ceramics which are considered the most effective far infrared ray emitting bodies at the present time are oxides of transition elements such as $MnO_2$, $Fe_2O_3$, CuO, CoO, and the like, or ceramics obtained by mixing these transition element oxides with Kibushi-Nendo (a clay) or petarite, as a low-thermal expansion material, and by calcining the mixture at above 1,000° C. These materials are very close to a black body exhibiting a high degree of radiation activity throughout the entire infrared range.

Various far infrared ray emitting bodies are on the market, including those mentioned above as well as naturally occurring materials. Their qualities, far infrared radiation capacities, and production costs remain, however, to be improved.

The present inventors have undertaken extensive studies to develop a far infrared ray emitting body possessing a stronger radiation capacity. The studies have been concentrated on various kinds of powders of inorganic materials, especially on their particle sizes, particle size distributions, and the effect of these factors on their far infrared radiation capacities. As a result, the inventors found that an inorganic powder emitted far infrared rays of a higher strength when the powder was more particulate and its particle size was more closely distributed. This finding has matured into a far infrared ray emitting body comprising a base material or a core material having an ultrafine inorganic powder with a closely distributed particle size adhered on said base or core material.

Further studies by the inventors revealed that alumina and silica are the most effective inorganic powders for adherence onto core materials, and that the most effective far infrared radiation could be obtained when the inorganic powders had a particle size below 500 angstrom, and preferably below 200 angstrom. That is to say, the body having an uneven, large specific surface area provides a larger radiation effect. The far infrared ray emitting body exhibited a considerable radiation capacity without a calcining process.

SUMMARY OF THE INVENTION

Accordingly, an object of this invention is to provide a far infrared ray emitting body comprising a core material having ultrafine powder of one or more compounds selected from alumina hydrate, silica hydrate, alumina, silica, and silicate adhered on said core material.

Another object of this invention is to provide a process for preparing a far infrared ray emitting body comprising:
providing an aqueous dispersion of a core material,
causing a fine particulate inorganic material to be chemically produced in said aqueous dispersion of a core material,
causing said fine particulate inorganic material to adhere on and cover said core material, and
dehydrating, molding, drying, and/or sintering said material.

Other objects, features and advantages of the invention will hereinafter become more readily apparent from the following description.

DETAILED DESCRIPTION OF THE INVENTION AND PREFERRED EMBODIMENTS

The core material used in this invention may be selected from a wide variety of materials. It may be a naturally occurring clay mineral such as kaolin, mica, or silicate; a synthetic inorganic compound such as alumina or silica; a synthetic pigment such as zirconia or titania; an organic material in a particle, fiber, film, or other form. Given as more specific examples of the material which can be used as a core material in this invention are thin-layered minerals such as kaolin, vermiculite, mica, and the like; spherical particles such as spherical silica, beryllium, and the like; fibrous material such as glass fibers, ceramic fibers, carbon fibers, zeolite fibers, synthetic or natural fibers, and the like; porous material such as zeolite, diatomaceous earth, and the like; pigments, including various oxides, carbonates, sulfates, and nitrates, such as zirconia, titanium white, zinc white, barium titanate, and the like; and films such as plastic films.

Ultrafine inorganic particles in this invention are formed in an aqueous dispersion of core material by adding inorganic compounds which can produce by reaction such inorganic particles. Preparation of such ultrafine inorganic particles is described in the pending U.S. patent ppplication Ser. No. 07/152,853 by the present inventors. Specifically, particles may be those of alumina hydrate or silica hydrate formed by a chemical reaction in an aqueous dispersion of core materials. A typical example of a fine particulate inorganic material is alumina hydrate produced by the reaction of aluminum chloride and ammonium hydroxide. Other examples of such fine particulate inorganic materials are silica, silicate, and the like. For example, to an aqueous solution of aluminum chloride an equivalent amount of ammonium hydroxide to neutralize the aluminum chloride is added to obtain alumina hydrate. In this instance, fine particles of the inorganic material, e.g. alumina hydrate in this case, deposit in the aqueous dispersion system. Needle-like alumina hydrate deposits and adheres on the surfaces of the suspended core material to form a film, thus producing an ideal uneven surface with a large specific surface area which can provide a significant far infrared radiation effect.

Hydrate of alumina or silia takes the form of ultrafine particles having a size of 100 to 200 angstrom. The ultrafine particles remain unagglomerated in the dispersion and adhere on and evenly cover the surfaces of core materials to produce a reformed material with a uniform silica or alumina coat. Taking a reformed kaolin (a core material) covered with alumina hydrate, as an example, when water is eliminated and the material is dried, this material has a very uniformly aligned kaolin-alumina hydrate-kaolin structure, which can never been seen in a mere mixture of kaolin and alumina. It is impossible to prepare alumina hydrate particles of a 100 to 200 angstrom size by any other means. Sizes on the order of 3,000 angstrom are considered to be an ultrafine aluminum particle size according to the present technological level. Besides silica and alumina, other inorganic compounds can be used as the covering ultrafine powdery material of this invention, so long as such compounds can be prepared by the reaction of a soluble acid and a soluble alkali. Examples of such compounds are carbonates of calcium, magnesium, barium, and the like.

The material reformed by silica hydrate or alumina hydrate of this invention can be calcined at a temperature above 500° C. to convert the hydrate into the anhydrous oxide without impairing its effect as a far infrared ray emitting body.

The far infrared ray emitting body of this invention can be processed into compressed molded articles, films, fibers, and the like and directed to a variety of applications.

Other features of the invention will become apparent in the course of the following description of the exemplary embodiments which are given for illustration of the invention and are not intended to be limiting thereof.

Examples

EXAMPLE 1

Ten (10) kg of kaolinite (UW-90, manufactured by Engelhard Minerals and Chemicals Corp.) having a specific surface of 15 m$^2$/g was dispersed into 10 m$^3$ of water. To this dispersion, AlCl$_3$ was added in such an amount that alumina hydrate (as Al$_2$O$_3$·3H$_2$O) of 5 kg could be produced. To this, NH$_4$OH equivalent to neutralize AlCl$_3$ was added to ensure precipitation and adsorption of alumina hydrate of a 100 angstrom size on the surface of kaolinite. Water was removed from the product by means of a filter press, followed by drying. The dried substance was pulverized by hammer to obtain a far infrared ray emitting body.

EXAMPLE 2

No. 3 water glass containing 5 kg of SiO$_2$ was added to 10 kg of a dispersion of kaolinite prepared in the same manner as in Example 1. To this mixture HCl in an amount equivalent to neutralize SiO$_2$ added to produce kaolinite having a specific surface of 250 m$^3$/g, the surface of which was reformed by a silica film. From this material, a far infrared ray emitting body was prepared in the same manner as in Example 1.

EXAMPLE 3

A far infrared ray emitting body of mica having a specific surface of 280 m$^3$/g, and the surface of which was reformed by alumina, was prepared in the same manner as in Example 1. In this Example mica having a specific surface of 12 m$^2$/g (prepared by Canada Mica Co.) was used instead of kaolinite of Example 1.

EXAMPLE 4

A far infrared ray emitting body was prepared in the same manner as in Example 1, except that instead of kaolinite of Example 1, TiO$_2$ having an average particle size of 0.2 μm (Anatase-type, manufactured by Tohoku Titanium Co., Ltd.) was used. A far infrared ray emitting body having a specific surface of 25 m$^3$/g, and the surface of which was reformed by alumina hydrate, was prepared in the same manner as in Example 1.

EXAMPLE 5

A far infrared ray emitting body of polypropylene tip the surface of which was reformed by alumina was prepared in the same manner as in Example 1. In this Example polypropylene tips having a diameter of 1 mm (manufactured by OK Trading Co., Ltd.) were used instead of kaolinite of Example 1.

COMPARATIVE EXAMPLE 1

To a 10% aqueous dispersion containing 10 kg of kaolinite (UW-90) 50 kg of 10% aqueous dispersion of fine particulate aluminum hydroxide having a diameter of 0.5 μm (C-3005 manufactured by Sumitomo Chemical Co., Ltd.) was added. The mixture was thoroughly stirred, and dehydrated dried and pulverized in the same manner as in Example 1. The pulverized material was calcined at 1,200° C. for 4 hours to obtain a kaolin-alumina-type far infrared ray emitting body.

COMPARATIVE EXAMPLE 2

Fine particulate aluminum hydroxide (C-3005) was used in place of alumina hydrate used in Example 4 to prepare a wet mixture of 10 kg of TiO$_2$ and 5 kg of aluminum hydroxide. The mixture was dehydrated, dried, pulverized, and calcined at 1,200° C. for 4 hours to obtain a TiO$_2$-Al$_2$O$_3$-type far infrared ray emitting body.

TEST EXAMPLE

An infrared radiation strength of between 2 μm and 30 μm was measured for each of the samples prepared in the above examples and in comparative examples. The measurement was carried out using an infrared spectrometer (Type A-302 manufactured by Nippon Bunkokogyo Co., Ltd.) equipped with an auxiliary photometer. The detector plotted a comparative value of each sample against a black body which was used as a standard.

Table 1 shows the mean integral value, for each sample, of the far infrared radiation strength between 5 to 15 μm, a range having a significance in view of various applications of far infrared radiation. In the table, the relative strength at 300° C. represents the relative value of each sample taking a radiation strength at 5–15 μm of the sample prepared in Example 1 as 100%.

Fifty (50) parts by weight of each product produced in the above examples and comparative examples were mixed and kneaded with 100 parts by weight of polypropylene (K-1008 manufactured by Chisso Polypropylene Co., Ltd.) and processed into plastic films. The radiation strength at 5–15 μm of each film was measured at 100° C. according to the method described above. The results were expressed as the relative radiation strength of each film when the radiation strength at 5-15 μm measured at 100° C. of the sample prepared in Example 1 was taken as 100.

TABLE 1

| Product | Relative Radiation at 300° C. (%) | Relative Radiation of Polypropylene Film at 100° C. |
| --- | --- | --- |
| Example 1 | 100 | 25 |
| Example 2 | 80 | 18 |
| Example 3 | 95 | 22 |
| Example 4 | 95 | 22 |
| Example 5 | — (melted) | 25 |
| Comparative Example 1 | 50 | 13 |
| Comparative Example 2 | 45 | 10 |

According to the present invention, the surface of a core material such as kaolinite is reformed by the covering of ultrafine particles of alumina hydrate or silica hydrate to provide a very efficient far infrared ray emittng body, without calcining it at a high temperature of above 1,000° C. The body can be processed into various forms conforming to the use to which it is directed. The fields in which this product can be used encompasses those listed in Table 2.

TABLE 2

| Field | Expected Effects | Application Examples |
| --- | --- | --- |
| Drying | High-speed drying<br>Energy savings<br>Homogeneous drying | Paint, Ink, Powder, Fibers, Tea, etc. |
| Heating | High-speed heating<br>Energy savings<br>Homogeneous heating | Gellation of polymers, Softening of resins, Freeze-proofing, etc. |
| Food Processing | High-speed processing<br>Taste/flavor/freshness maintenance and promotion | Fish meat paste, Bread, Meat, Fish, Vegetables, etc. |
| Agriculture Breeding | Cell activation<br>Growth promotion | Pig breeding, Green house control, Plant growth |
| Health Medication | Environment conditioning<br>Metabolism promotion | House, Factory, Office, Sauna, Rehabilitation facilities, etc. |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A far infrared ray emitting body, comprising:
a core material having adhered thereto an ultrafine powder of a particle size below 500 Å of one or more compounds selected from the group consisting of alumina hydrate, silica hydrate, and mixtures thereof which is chemically produced in an aqueous dispersion of said core material.

2. The far infrared ray emitting body according to claim 1, wherein said core material is a material selected from the group consisting of naturally occurring clay minerals, synthetic inorganic compounds, synthetic pigments, and organic materials.

3. The far infrared ray emitting body according to claim 1, wherein said ultrafine powder has a particle size of 200 Å or below.

* * * * *